US012580838B2

(12) United States Patent
Kumar et al.

(10) Patent No.: US 12,580,838 B2
(45) Date of Patent: Mar. 17, 2026

(54) METHODS AND APPARATUS FOR RANGE TESTING MOCK DEVICES USING MESH TOPOLOGY

(71) Applicant: Enphase Energy, Inc., Petaluma, CA (US)

(72) Inventors: Darshan Rachamadugu Nanda Kumar, Basavanagudi (IN); Ashish Bansal, Bengaluru (IN)

(73) Assignee: Enphase Energy, Inc., Petaluma, CA (US)

( * ) Notice: Subject to any disclaimer, the term of this patent is extended or adjusted under 35 U.S.C. 154(b) by 432 days.

(21) Appl. No.: 18/377,342

(22) Filed: Oct. 6, 2023

(65) Prior Publication Data

US 2024/0129222 A1 Apr. 18, 2024

(30) Foreign Application Priority Data

Oct. 17, 2022 (IN) .............................. 202211059067

(51) Int. Cl.
*H04L 12/00* (2006.01)
*H04L 43/50* (2022.01)

(52) U.S. Cl.
CPC .................................. *H04L 43/50* (2013.01)

(58) Field of Classification Search
CPC .......... H04L 43/50; H04L 41/22; H04L 41/12
USPC .......................................... 370/252
See application file for complete search history.

(56) References Cited

U.S. PATENT DOCUMENTS

| 10,657,038 B1 * | 5/2020 | Bates ...................... H04L 43/50 |
| 2010/0070869 A1 * | 3/2010 | Kawashima ............ H04L 41/22 |
| | | 715/736 |

FOREIGN PATENT DOCUMENTS

CN 115129586 A * 9/2022 .......... G06F 11/3684

* cited by examiner

*Primary Examiner* — Frantz Coby
(74) *Attorney, Agent, or Firm* — Moser Taboada

(57) ABSTRACT

Methods and systems for range testing mock devices using mesh topology are provided herein. For example, a method for range testing mock devices using mesh topology comprises supplying power to a plurality of mock devices corresponding to a plurality of actual devices in an energy management system, adding the plurality of mock devices to a range test list via a first wireless protocol, positioning the plurality of mock devices in a location where the plurality of actual devices will be installed, and triggering a range test via a second wireless protocol different than the first wireless protocol to determine if the plurality of mock devices have communication therebetween.

20 Claims, 4 Drawing Sheets

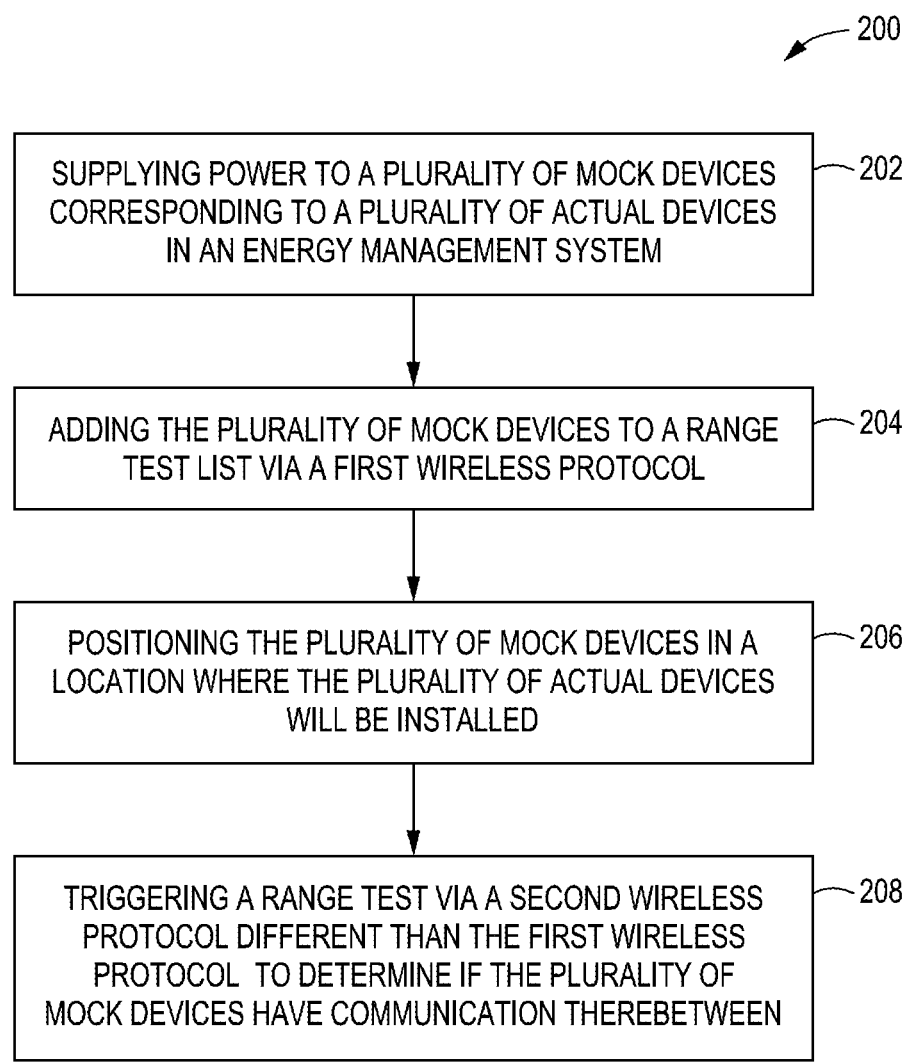

— 200

SUPPLYING POWER TO A PLURALITY OF MOCK DEVICES CORRESPONDING TO A PLURALITY OF ACTUAL DEVICES IN AN ENERGY MANAGEMENT SYSTEM — 202

ADDING THE PLURALITY OF MOCK DEVICES TO A RANGE TEST LIST VIA A FIRST WIRELESS PROTOCOL — 204

POSITIONING THE PLURALITY OF MOCK DEVICES IN A LOCATION WHERE THE PLURALITY OF ACTUAL DEVICES WILL BE INSTALLED — 206

TRIGGERING A RANGE TEST VIA A SECOND WIRELESS PROTOCOL DIFFERENT THAN THE FIRST WIRELESS PROTOCOL TO DETERMINE IF THE PLURALITY OF MOCK DEVICES HAVE COMMUNICATION THEREBETWEEN — 208

FIG. 2

METHODS AND APPARATUS FOR RANGE TESTING MOCK DEVICES USING MESH TOPOLOGY

CROSS-REFERENCE TO RELATED APPLICATIONS

The present application claims the benefit of and priority to Indian Provisional Application Serial No. 202211059067, filed on Oct. 17, 2022, the entire contents of which is incorporated herein by reference.

BACKGROUND

Field

Embodiments of the present disclosure generally relate to distributed energy generation systems and, for example, to methods and apparatus for range testing mock devices using mesh topology.

Description of the Related Art

An energy management system provides an innovative solution to a main panel upgrade (MPU) by connecting additional photovoltaics (PVs) and storage system(s) to a smart switch (microgrid interconnect device (MID)), e.g., as opposed to the main panel, thus avoiding the MPU for whole home and subpanel backup systems. With respect to whole home backup, for example, the smart switch is connected between the utility meter and the main panel with an over current protection device that limits the amount of current that can flow to the main panel, thus avoiding the MPU. For the subpanel backup, an installer can move as much load circuits from the main panel to the sub-panel.

Additionally, range testing is a known feature that can be used to determine an ideal location to install one or more devices that are part of the energy management system, e.g., a battery, range extender, microinverter, a local controller, gateway, etc.). During range testing, for example, conventional methods/apparatus can measure signal strength of a mesh topology (e.g., Zigbee, Bluetooth (BT), Bluetooth Low Energy (BLE), etc.) between the one or more devices using communication kits as substitute devices (e.g., one or more mock devices) for the one or more actual devices. Range testing helps an installer determine whether the one or more actual devices will be able to communicate with each other before installing the one or more actual devices in their preferred location.

Therefore, there is a need for methods and apparatus for range testing mock devices using mesh topology.

SUMMARY

Embodiments disclosed herein provide methods and apparatus for range testing mock devices using mesh topology. For example, methods for range testing mock devices using mesh topology comprise supplying power to a plurality of mock devices corresponding to a plurality of actual devices in an energy management system, adding the plurality of mock devices to a range test list via a first wireless protocol, positioning the plurality of mock devices in a location where the plurality of actual devices will be installed, and triggering a range test via a second wireless protocol different than the first wireless protocol to determine if the plurality of mock devices have communication therebetween.

In accordance with at least some embodiments, a non-transitory computer readable storage medium has instructions stored thereon that when executed by a processor perform a method for range testing mock devices using mesh topology. For example, the method comprises supplying power to a plurality of mock devices corresponding to a plurality of actual devices in an energy management system, adding the plurality of mock devices to a range test list via a first wireless protocol, positioning the plurality of mock devices in a location where the plurality of actual devices will be installed, and triggering a range test via a second wireless protocol different than the first wireless protocol to determine if the plurality of mock devices have communication therebetween.

In accordance with at least some embodiments, a system for range testing mock devices using mesh topology can comprise a plurality of mock devices corresponding to a plurality of actual devices in an energy management system and a processor inoperable communication with the plurality of mock devices and configured to add the plurality of mock devices to a range test list via a first wireless protocol and trigger a range test via a second wireless protocol different than the first wireless protocol to determine if the plurality of mock devices have communication therebetween.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a flowchart of a method for range testing mock devices using mesh topology for installing one or more actual devices of the energy management system of FIG. 1, in accordance with at least one embodiment of the present disclosure;

DETAILED DESCRIPTION

Embodiments of the present disclosure comprise methods and apparatus for range testing mock devices using mesh topology. For example, a method for range testing mock devices using mesh topology for installing one or more actual devices of an energy management system can comprise supplying power to a plurality of mock devices corresponding to a plurality of actual devices in an energy management system, adding the plurality of mock devices to a range test list via a first wireless protocol, positioning the plurality of mock devices in a location where the plurality of actual devices will be installed, and triggering a range test via a second wireless protocol different than the first wireless protocol to determine if the plurality of mock devices have communication therebetween. The methods and apparatus described herein help a user to quickly and efficiently determine if one or more actual devices are able to communicate with each other before installing (and/or powering) the one or more actual devices in their preferred location within an energy management system, thus, reducing time and effort required to install the one or more actual devices (e.g., unboxing, wall fixing, connecting, etc.), which can increase installations and revenue for a company.

Figure 1:
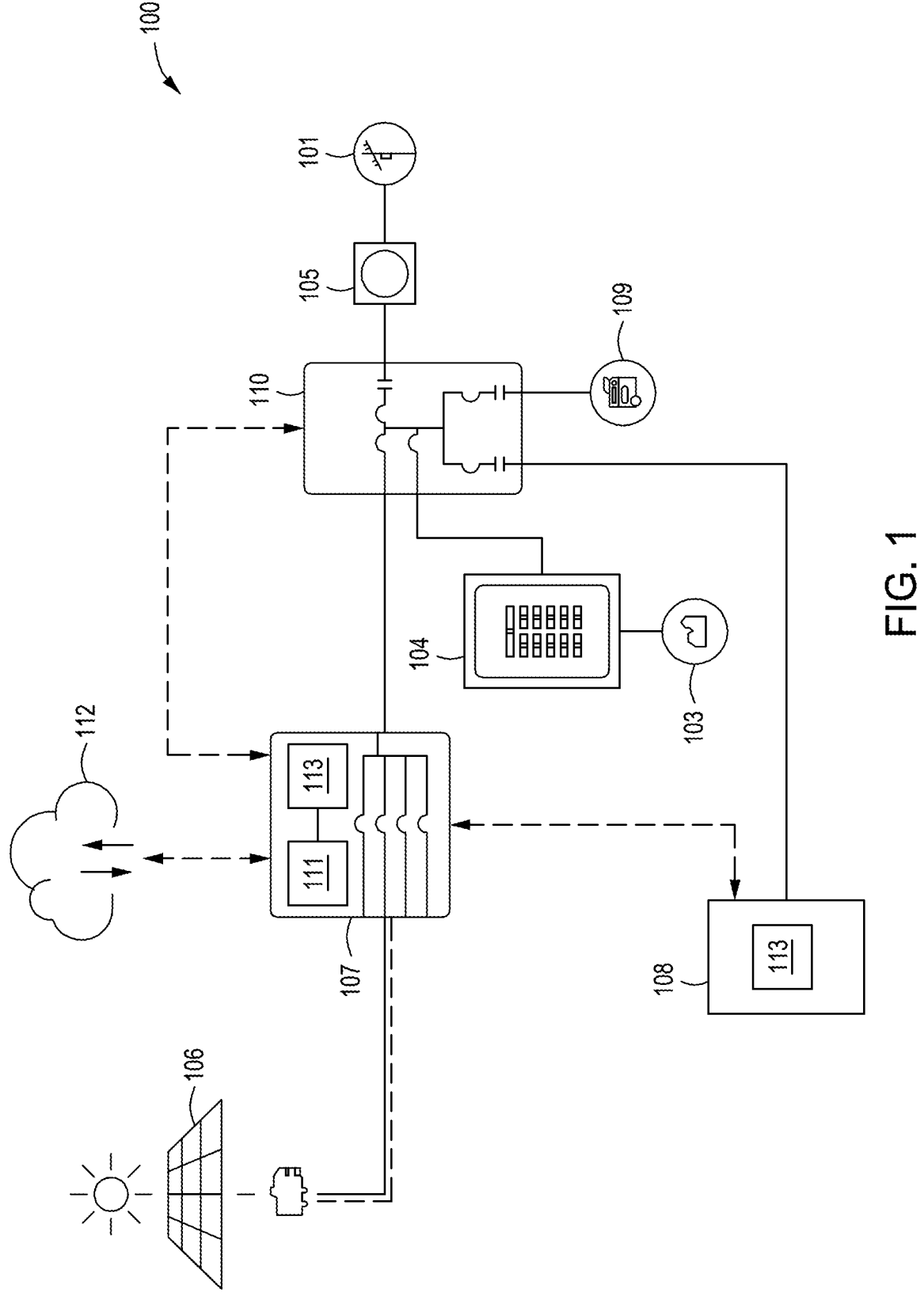
FIG. 1 is a block diagram of an energy management system, in accordance with at least one embodiment of the present disclosure.

FIG. 1 is a diagram of a backup configuration supported by an energy management system 100, in accordance with at least some embodiments of the present disclosure.

In at least some embodiments, the energy management system 100 can be provided as a kit. For example, for grid-tied PV only, for grid-tied PV and storage, and/or for a grid-agnostic energy management systems, one or more of the PVs, one or more batteries (e.g., a single-phase (SP) battery and/or a three-phase (3P) battery), a smart switch, a combiner/gateway, cables and/or accessories can be provided in the kit. Additionally, two main breakers for a supply side and a load side connection of the smart switch, and circuit breakers for connection of PVs and storage systems can also be provided in the kit.

Continuing with FIG. 1, in at least some embodiments, the energy management system 100 comprises one or more electronic devices. In at least some embodiments, the one or more electronic devices can comprise a storage system 108, a smart switch 110 (e.g., transfer switch), a combiner 107 including a wireless adaptor, which can be a USB dongle that connects to a communication gateway, one or more PVs 106 (e.g., solar panels), and a tertiary control 112 (e.g., cloud-based tertiary control using application programming interface (API)), which can provide over-the-air firmware upgrade.

The PVs 106 can be coupled in a one-to-one correspondence to a plurality of power converters, which can be a bi-directional power converter. The plurality of power converters convert DC power received from a corresponding PV and the storage system 108 to grid-compliant AC power and couple the generated AC power to the main load panel 104 via the smart switch 110. The main load panel 104 couples the generated power to one or more appliances (one or more loads) and/or a power grid, such as a local power grid or a commercial power grid. In other embodiments, the power converters may be coupled to the appliance(s), grid, and/or a local controller without the use of the main load panel 104.

The combiner 107 can connect/communicate with the smart switch 110 and the storage system 108 via a wireless connection (or wired connection, such as an AC power wire) and with the Internet and/or cloud via Wi-Fi or cellular connections. For example, the combiner 107 comprises the communication gateway to which the wireless adaptor connects and communicates with the smart switch 110, the storage system 108, and the Internet and/or cloud. The combiner 107 connects to the PVs 106 and can communicate with the PVs 106 via a power line communication (PLC) over an AC power wire, and the other components of the energy management system 100 can connect to each other via the AC power wire. For example, the combiner 107 may retrieve data from the power converters, send commands to the power converters, and perform similar functions with respect to the PVs 106.

The combiner 107 can comprise a memory 111 that comprises one or more forms of non-transitory computer readable storage medium including one or more of, or any combination of, read-only memory or random-access memory. The memory 111 stores software (e.g., instructions) and data including, for example, an operating system, a servicing module, a communications module and data. The operating system may be any form of operating system such as, for example, Apple iOS, Microsoft Windows, Apple macOS, Linux, Android or the like. The servicing module may be software that, when executed by a processor 113, is capable of installing one or more devices of the energy management system 100, in accordance with embodiments of the disclosure described herein. The communication module may be software that, when executed by the processor 113, enables communication between the combiner 107 and one or more devices of the energy management system 100. A combiner that is suitable for use with the energy management system 100 is the IQ® line of combiners available from Enphase Energy, Inc., from Petaluma, California.

In at least some embodiments, the energy management system 100 of FIG. 1 can be configured as a whole home backup (or partial home backup and subpanel backup) with the smart switch 110 of the energy management system 100 located at a service entrance (e.g., connected to a meter 105 which is connected to a utility grid 101). A user can back up a main load panel 104 (e.g., Siemens MC3010B1200SECW or MC1224B1125SEC, GE 200 Amp 20/40, and the like), which connects to one or more loads 103 (e.g., critical loads or backup loads). In such an embodiment, the smart switch 110 can support up to an 80 A breaker for the PVs 106 connected to the combiner 107 (e.g., PV combiner, (solar)) and an 80 A breaker for a battery storage circuit (e.g., for the storage system 108). When an existing combiner 107 is connected to the main load panel 104, a user can keep the combiner 107 connected to the main load panel 104, connect only the storage system 108 to the smart switch 110, and the space in the smart switch 110 for the combiner 107 can be left vacant and used for additional battery storage.

The storage system 108 is part of the energy management system 100 and is configured to participate in grid services, such as capacity and demand response. The storage system 108 is durable NEMA type 3R outdoor rated. The storage system 108 is configured as a modular AC-coupled battery storage system with time-of-use (ToU) and backup capability, which allows for easy installation.

Additionally, the storage system 108 connects to the smart switch 110 and the combiner 107 and is configured to provide backup power when installed in a home or at a site. The storage system 108 includes one or more of a SP battery (120V) or a 3P battery (240V) (e.g., three SP batteries connected to each other, hereinafter 3P battery), which include corresponding internal microinverters, that are connected to (or integrated with) the PVs 106. The storage system 108 can be configured to detect when it is optimal to charge or discharge the SP battery and/or the 3P battery so that energy can be stored therein when energy is abundant and used when scarce.

Moreover, the storage system 108 is configured to self-protect against low state of charge (e.g., <1%) of battery packs, or cell voltages remaining in extreme low warning region. For example, the storage system 108 is configured to shut down an AC bus and/or DC bus to prevent cell discharge of the SP battery and/or the 3P battery when required.

In embodiments, the storage system 108 is configured to send notification alerts via, for example, the combiner 107 to a user. The notification, for example, can be suitable text indicating that the state of charge of the cells of the SP battery or the 3P battery are low, e.g., very low state of charge of the battery cells. Other text can also be used to alert a user. The alerts can also be available to a user and/or a technician or customer service representative to enable proactive appropriate preventive measures to avoid damage to the SP battery and/or the 3P battery. Moreover, the storage system 108 includes suitable energy reserve to self-protect against extremely low state of charge of battery cells of the SP battery and/or the 3P battery due to self-discharge losses of the storage system, e.g., for at least seven days after a notification is sent to a user, technician, and/or customer service representative. In at least some embodiments, the storage system 108 is configured to allow a user to set a remaining state of charge for each day.

FIG. 2 is a flowchart of a method 200 for range testing mock devices using mesh topology for installing one or more actual devices of the energy management system of FIG. 1, and FIGS. 3-8 are diagrams of screen shots corresponding to the method of FIG. 2, in accordance with an embodiment of the disclosure. The method 200 can be implemented using one or more computing devices, such as smart devices (e.g., a smart phone, iPad®, laptop, personal computer, etc.). For illustrative purposes, the method 200 is described in conjunction with a smart phone that is communicatively connectable to the one or more mock devices, the one or more actual devices, and/or the tertiary control 112 as described in more detail below.

For example, at 202, the method 200 comprises supplying power to a plurality of mock devices corresponding to a plurality of actual devices in an energy management system. For example, during an installation process, a user (e.g., installer, technician, etc.) can power up a plurality of mock devices that correspond to a plurality of actual components (e.g., the storage system 108, the combiner 107, the PVs 106 including the corresponding inverters, the smart switch 110, and a generator 109, when used) of the energy management system 100. The plurality of mock devices can be configured to communicate with each other via one or more wireless communication protocols, e.g., Zigbee, BT, BLE, and the like.

Next, at 204, the method 200 comprises adding the plurality of mock devices to a range test list via a first wireless protocol (e.g., BLE). For example, as shown in the screen shot 300 of FIG. 3, in at least some embodiments, the method 200 can comprise displaying on a display of the smart phone one or more selectable areas 301 so that the user can add each of the plurality of mock devices. For example, adding the plurality of mock devices to the range test list can comprise scanning each of the plurality of mock devices. In at least some embodiments, for example, a user can scan, using a camera of the smart phone, indicia (e.g., a barcode) on the plurality of mock devices. The indicia can correspond to a serial number or a name of a corresponding one of the plurality of actual devices (e.g., at least one of a rechargeable battery, a gateway, or a range extender. For example, when a mock device corresponds to the combiner 107 and the indicia is scanned, the method 200 can comprise displaying each of the plurality of mock devices (e.g., the combiner 107) on a display of an electronic device (e.g., the smart phone) and assigning to the plurality of mock devices at least one of a serial number of the actual device or a name of the actual device (see 302, for example).

Figures 3, 4, 5, 6, 7, 8:
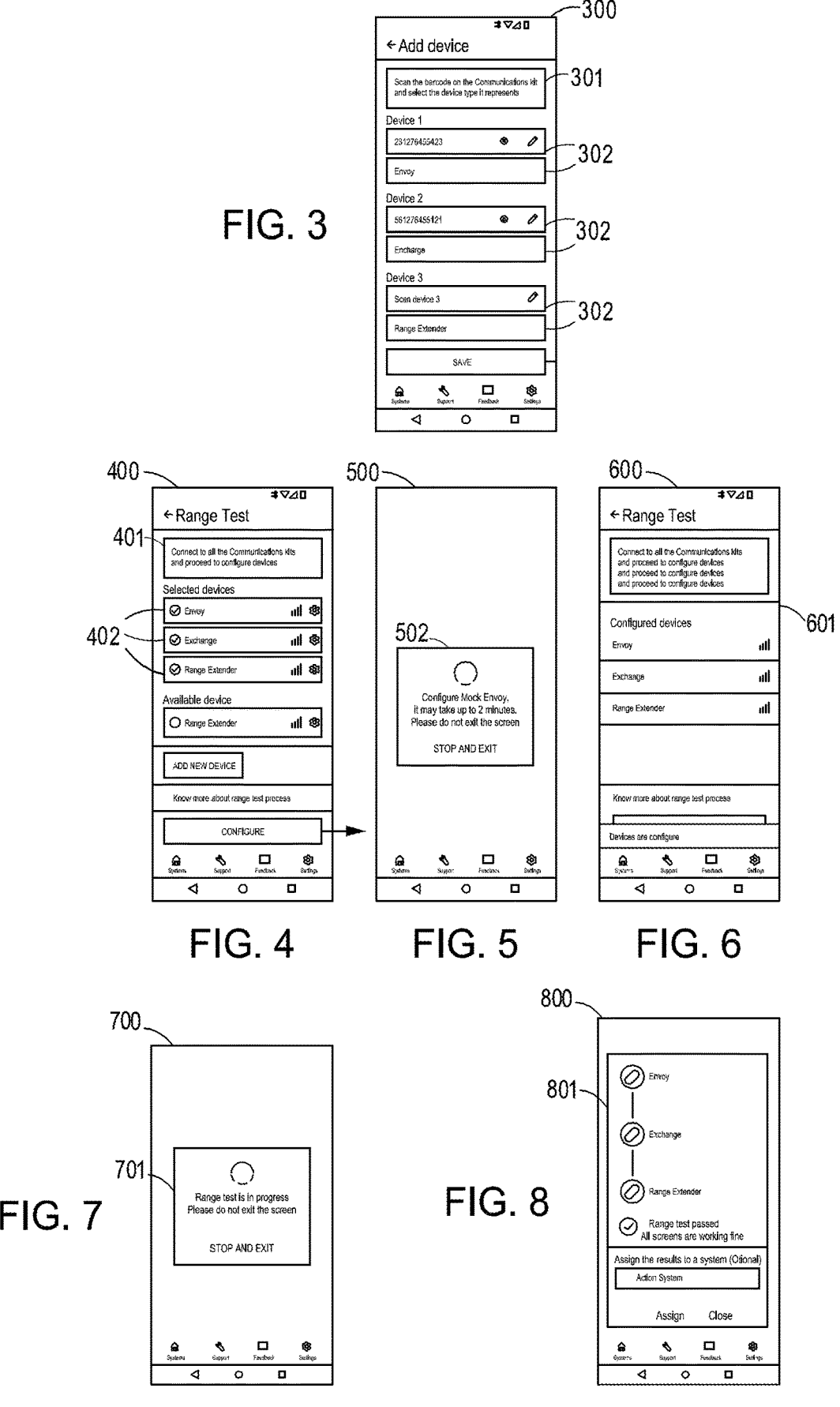
FIGS. 3-8 are diagrams of screen shots corresponding to the method of FIG. 2, in accordance with at least one embodiment of the present disclosure.

After the plurality of mock devices have been added at 204, the method 200 can comprise configuring the added plurality of mock devices (see screen shots 400 and 500 of FIGS. 4 and 5, respectively). For example, the user can connect via the first wireless protocol to the plurality of mock devices (see 401, for example). In at least some embodiments, the method 200 can comprise displaying a selectable area for adding available mock devices discovered while configuring the plurality of mock devices and/or a selectable area for adding selected available mock devices (see 402 and 502, respectively). The method 200 can also comprise displaying configured mock devices and providing an indication that the configured mock devices can be positioned in a location corresponding to an actual device (see 601 of screen shot 600 of FIG. 6).

For example, at 206, the method 200 comprises positioning the plurality of mock devices in a location where the plurality of actual devices will be installed. For example, in at least some embodiments, a user can position the plurality of mock devices in the locations corresponding to the storage system 108, the combiner 107, and the smart switch 110, etc.

Next, at 208, the method 200 comprises triggering a range test via a second wireless protocol (e.g., Zigbee) different than the first wireless protocol to determine if the plurality of mock devices have communication therebetween (see 701 of screen shot 70 of FIG. 7). For example, at 208, the plurality of mock devices transmit test signals to each other via Zigbee to determine if the mock devices have adequate communication therebetween.

Next, in at least some embodiments, the method 200 can comprise after triggering the range test, displaying a result of the range test on a display of an electronic device, such as displaying at least one of a pass or fail indication, and strength of a test signal for each of the plurality of mock devices (see 801 of screen shot 800 of FIG. 8). Additionally, in at least some embodiments, the results can be transmitted to a device/system for storage. For example, the results can be transmitted to the tertiary control 112 or another storage device.

After all of the plurality of mock devices receive a pass indication, a user can position the plurality of actual devices in their corresponding positions and use them as intended.

Figure 9:
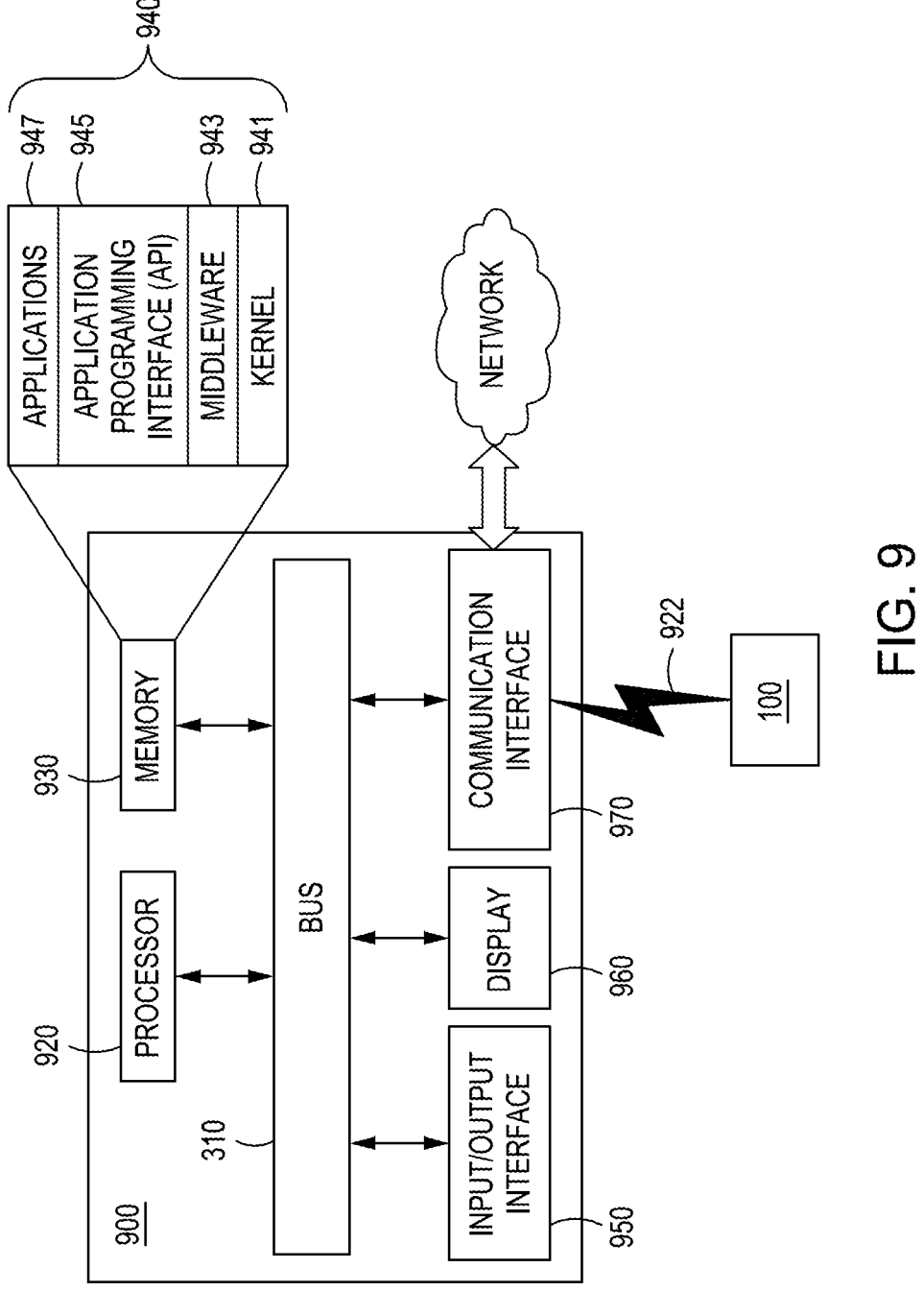
FIG. 9 is a block diagram of a mock device for installing one or more actual devices of the energy management system of FIG. 1, in accordance with at least one embodiment of the present disclosure.

FIG. 9 is a block diagram of a mock device 900 for installing one or more actual devices of the energy management system of FIG. 1, in accordance with at least one embodiment of the present disclosure. One or more of the components of mock device 900 may also be a component of the actual devices of the energy management system (e.g., the storage system 108, the smart switch 110, the combiner 107, the one or more PVs 106 (e.g., solar panels), and the tertiary control 112.

The mock device 900 includes a bus 910, a processor or processor 920, a memory 930 (or storage, e.g., non-transitory computer readable storage medium), an input/output interface 950, a display 960, and a communication interface 970. At least one of the above-described components may be omitted from the mock device 900 or another component may be further included in the mock device 900.

The bus 910 may be a circuit connecting the above-described components 920, 930, 950, 960, and 970 and transmitting communications (e.g., control messages and/or data) between the above-described components.

The processor 920 may include one or more of a central processing units (CPU), an application processor (AP), and a communication processor (CP). The processor 920 can control at least one of the other components of the mock device 900 and/or processing data or operations related to communication.

The memory 930 may include volatile memory and/or non-volatile memory. The memory 930 can store data or commands/instructions related to at least one of the other components of the mock device 900. The memory 930 can store software and/or a program module 940 (e.g., instructions for performing the method 200). For example, the program module 940 may include a kernel 941, middleware 943, an API 945, application 947 (or applications, e.g., software-based application for performing the method 200). The kernel 941, the middleware 943 or at least part of the API 945 may be called an operating system.

The kernel 941 can control or manage system resources (e.g., the bus 910, the processor 920, the memory 930, etc.) used to execute operations or functions of other programs (e.g., the middleware 943, the API 945, and the applications 947). The kernel 941 provides an interface capable of allowing the middleware 943, the API 945, and the applications 947 to access and control/manage the individual components of the mock device 900.

The middleware 943 may be an interface between the API 945 or the applications 947 and the kernel 941 so that the API 945 or the applications 947 can communicate with the kernel 941 and exchange data therewith. The middleware 943 is capable of processing one or more task requests received from the applications 947. The middleware 943 can assign a priority for use of system resources of the mock device 900 (e.g., the bus 910, the processor 920, the memory 930, etc.) to the application 947. The middleware 943 processes one or more task requests according to a priority assigned to at least one application program, thereby performing scheduling or load balancing for the task requests.

The API 945 may be an interface that is configured to allow the applications 947 to control functions provided by the kernel 941 or the middleware 943. The API 945 may include at least one interface or function (e.g., instructions) for file control, window control, image process, text control, or the like. For example, during the method 200, the API 945 allows the applications 947 to display one or more user interfaces that allow a user to navigate, for example, through one or more screens to enter information associated with the method 200.

The input/output interface 950 is capable of transferring instructions or data received from a user or external devices to one or more components of an electronic device (e.g., one or more of the components of the energy management system 100). The input/output interface 950 is capable of outputting instructions or data, received from one or more components of the mock device 900, to the user or external devices. The input/output interface 950 can be configured to create one or more GUIs for receiving a user input or an input from an electronic device (e.g., a user smart phone).

The display 960 may include a liquid crystal display (LCD), a flexible display, a transparent display, a light emitting diode (LED) display, an organic LED (OLED) display, micro-electro-mechanical systems (MEMS) display, an electronic paper display, etc. The display 960 can display various types of content (e.g., texts, images, videos, icons, symbols, etc.). The display 960 may also be installed with a touch screen, e.g., screens shots of FIGS. 3-8) for receiving touches, gestures, proximity inputs or hovering inputs, via a stylus pen, or a user's body. Accordingly, the display 950 can be used to receive a user input on one or more GUIs.

The communication interface 970 can establish communication between the mock device 900 and an external device (e.g., electronic device of the energy management system 100) connected to a network via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 922. Short-wireless communication 922 may include at least one of wireless fidelity (Wi-Fi), BT, BLE, Zigbee, near field communication (NFC), magnetic secure transmission (MST), etc. Wired communication may include at least one of universal serial bus (USB), high definition multimedia interface (HDMI), recommended standard, and plain old telephone service (POTS). The network may include at least one of a telecommunications network, e.g., a computer network (e.g., local area network (LAN) or WAN), the Internet, and a telephone network.

While the methods disclosed herein have been described with reference to one or more devices (mock/actual) associated with an energy management system, the present disclosure is not so limited. For example, the methods described herein can also be used for installing a host of internet of thing (IoT) devices in general, e.g., home security, field-based air-pollution sensors, water quality sensors, and so on. The mock devices described herein can be used to determine optimal communication of any of the IoT devices.

While the foregoing is directed to embodiments of the present disclosure, other and further embodiments of the disclosure may be devised without departing from the basic scope thereof.

What is claimed is:

1. A method for range testing mock devices using mesh topology, comprising:
   supplying power to a plurality of mock devices corresponding to a plurality of actual devices in an energy management system;
   adding the plurality of mock devices to a range test list via a first wireless protocol;
   positioning the plurality of mock devices in a location where the plurality of actual devices will be installed; and
   triggering a range test via a second wireless protocol different than the first wireless protocol to determine if the plurality of mock devices have communication therebetween.

2. The method of claim 1, wherein adding the plurality of mock devices comprises assigning to the plurality of mock devices at least one of a serial number of the plurality of actual devices or a name of the plurality of actual devices.

3. The method of claim 1, wherein the plurality of actual devices comprises at least one of a rechargeable battery, a gateway, or a range extender.

4. The method of claim 1, wherein adding the plurality of mock devices to the range test list comprises scanning each of the plurality of mock devices.

5. The method of claim 1, wherein adding the plurality of mock devices to the range test list comprises displaying each of the plurality of mock devices on a display of an electronic device.

6. The method of claim 1, further comprising, after triggering the range test, displaying a result of the range test on a display of an electronic device.

7. The method of claim 6, wherein displaying the result of the range test comprises displaying at least one of a pass or fail indication, and strength of a test signal for each of the plurality of mock devices.

8. A non-transitory computer readable storage medium having instructions stored thereon that when executed by a processor perform a method for range testing mock devices using mesh topology, comprising:

supplying power to a plurality of mock devices corresponding to a plurality of actual devices in an energy management system;

adding the plurality of mock devices to a range test list via a first wireless protocol;

positioning the plurality of mock devices in a location where the plurality of actual devices will be installed; and triggering a range test via a second wireless protocol different than the first wireless protocol to determine if the plurality of mock devices have communication therebetween.

9. The non-transitory computer readable storage medium of claim 8, wherein adding the plurality of mock devices comprises assigning to the plurality of mock devices at least one of a serial number of the plurality of actual devices or a name of the plurality of actual devices.

10. The non-transitory computer readable storage medium of claim 8, wherein the plurality of actual devices comprises at least one of a rechargeable battery, a gateway, or a range extender.

11. The non-transitory computer readable storage medium of claim 8, wherein adding the plurality of mock devices to the range test list comprises scanning each of the plurality of mock devices.

12. The non-transitory computer readable storage medium of claim 8, wherein adding the plurality of mock devices to the range test list comprises displaying each of the plurality of mock devices on a display of an electronic device.

13. The non-transitory computer readable storage medium of claim 8, further comprising, after triggering the range test, displaying a result of the range test on a display of an electronic device.

14. The non-transitory computer readable storage medium of claim 13, wherein displaying the result of the range test comprises displaying at least one of a pass or fail indication, and strength of a test signal for each of the plurality of mock devices.

15. A system for range testing mock devices using mesh topology, comprising:

a plurality of mock devices corresponding to a plurality of actual devices in an energy management system; and a processor in operable communication with the plurality of mock devices and configured to:

add the plurality of mock devices to a range test list via a first wireless protocol; and trigger a range test via a second wireless protocol different than the first wireless protocol to determine if the plurality of mock devices have communication therebetween.

16. The system of claim 15, wherein the processor is further configured to assign to the plurality of mock devices at least one of a serial number of the plurality of actual devices or a name of the plurality of actual devices.

17. The system of claim 15, wherein the plurality of actual devices comprises at least one of a rechargeable battery, a gateway, or a range extender.

18. The system of claim 15 wherein the processor is further configured to scan each of the plurality of mock devices.

19. The system of claim 15, wherein the processor is further configured to display each of the plurality of mock devices on a display of an electronic device.

20. The system of claim 15, wherein, after triggering the range test, the processor is further configured to display a result of the range test on a display of an electronic device.

\* \* \* \* \*